Aug. 24, 1954
K. L. ANDREWS
2,687,115
POULTRY FOUNTAIN
Filed Aug. 17, 1953
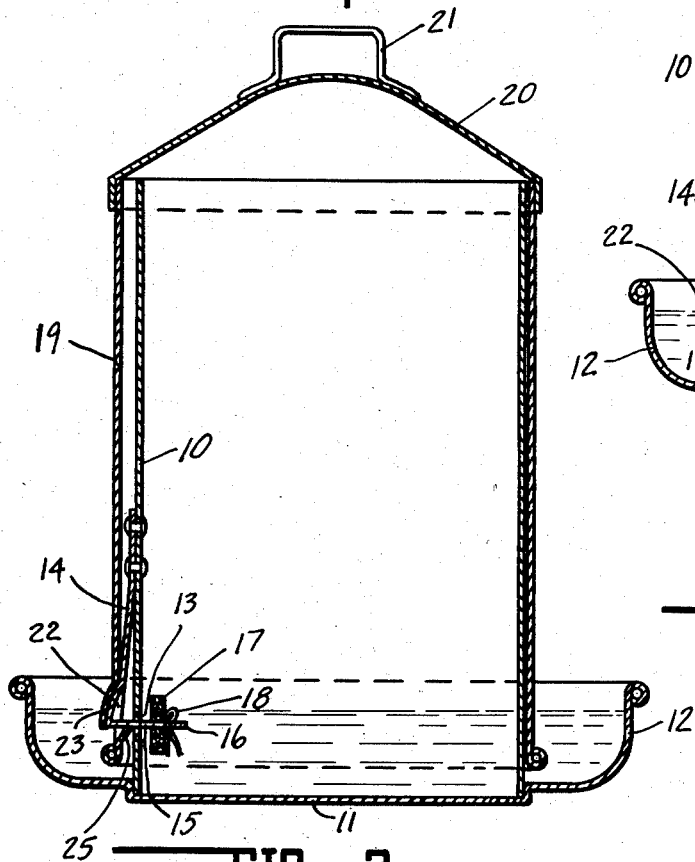
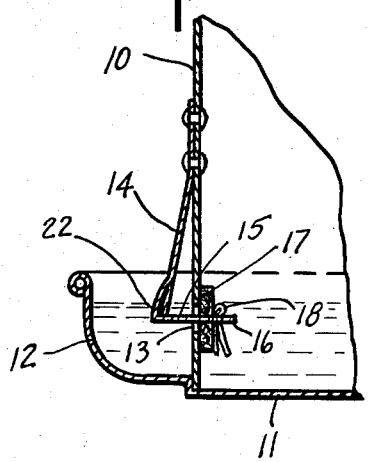
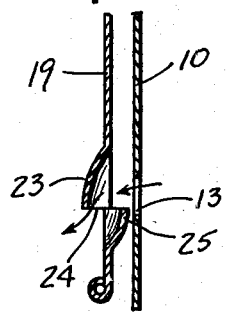
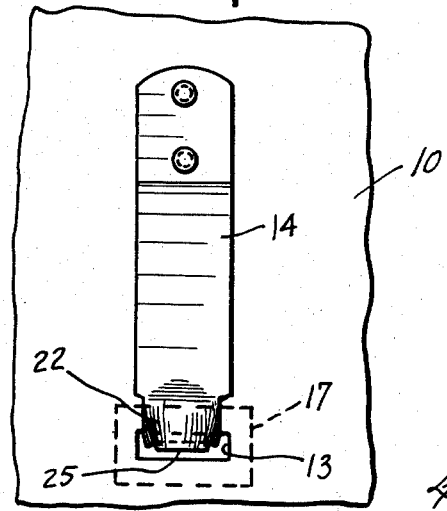
INVENTOR.
KENNETH L. ANDREWS.
BY
Lockwood, Galt, Woodard & Smith
ATTORNEYS.

Patented Aug. 24, 1954

2,687,115

UNITED STATES PATENT OFFICE 2,687,115

POULTRY FOUNTAIN

Kenneth L. Andrews, Macomb, Ill., assignor to Globe American Corporation, a corporation Application August 17, 1953, Serial No. 374,577

4 Claims. (Cl. 119—77)

This invention relates to a watering device for poultry commonly known as a "fountain," wherein there is provided a reservoir for a quantity of water which maintains a predetermined level in a surrounding drinking pan, being an improvement upon Letters Patent of Donald B. Tolley, No. 2,086,341, issued July 6, 1937, for "Poultry Fountain."

Fountains of this character are filled at the top, as distinguished from the usual inverted jar fountains. In such top filled fountains there is provided a water container having the lower portion thereof surrounded by an exteriorly exposed drinking pan apertured near its bottom and sealed by a cover projecting below the desired level of the water in the pan. Thus, the container, water sealed by the cover, automatically maintains the water level of the pan at the height of the feeding aperture.

In such structure there is employed an automatic valve for opening and closing the aperture through which water passes from the container to the outer pan in such a fashion that when the cover is inserted over the container to extend downwardly below the water level it automatically opens the valve to permit free passage of water from the container to the pan, but when the cover is removed, the valve is automatically closed so as to prevent free passage of water through the opening, such as would overflow the pan by reason of breaking the water seal effected by the cover.

One feature of this invention resides in a spring arm having a rounded protuberance, to provide a camming head, and which carries the closure valve for the feeding aperture in association with an outwardly bulged mating and seating camming lip adjacent an inwardly bulged interlocking ledge formed on the fountain cover. Said camming head and lip are so arranged that when said cover is positioned over the water container, it engages and cams the head in a direction to force the valve against spring tension of the arm to aperture opening position to permit flow of water through the aperture into the pan, and in which position the inwardly protruding ledge associated therewith interlocks with the valve to prevent displacement of the cover from the container. By merely turning the cover with respect to the container or manually actuating the camming head, the cover may be cammed to unlocked position and readily removed. But upon removal thereof, the valve will automatically close to prevent overflow.

Another feature of the invention lies in the louvered character of the water feed operative in the lid wherein the outwardly bulged camming lip provides a deflector for directing the flow of water downwardly into the pan and thereby prevent it from spraying over the outer edge thereof.

The full nature of the invention will be understood from the accompanying drawings and the following description and claims:

Fig. 1 is a central vertical section through the fountain showing the cover locked in water sealing position with the valve open.

Fig. 2 is a fragmental section, as in Fig. 1, showing the cover removed and the valve closed.

Fig. 3 is a fragmental front elevation of the container and valve with the cover removed.

Fig. 4 is a diagrammatical illustration showing the direction of water flow through the louvered cover aperture.

In the drawings there is illustrated a cylindrical water container 10 having an upright wall open at the top and closed by the bottom 11 of the drinking pan 12. An aperture or water passage 13 is provided in the side wall of the container adjacent the bottom of the pan 12 and preferably below the desired water level to be maintained therein.

Secured to the side wall of the container directly above the aperture 13 there is a spring arm 14 which extends downwardly, spaced from the wall of the container and terminating in an inwardly-extending projection 15 having a reduced portion 16 therein. Said projection extends through the aperture 13 and has mounted thereon within the container a valve 17 supported by the reduced portion 16 and held in position against the shoulders of the propection 15 by a cotter pin 18. The inherent spring tension of the arm 14 normally holds the valve 17 in water sealing position against the inner surface of the wall of the container for closing the aperture and sealing it against passage of water therethrough, as illustrated in Fig. 2.

After filling the container, the cover 19, which is of slightly larger diameter and extends the substantially full height of the container, is mounted thereover. Said cover is provided with an open bottom adapted to extend into the pan 12 close to the bottom thereof when mounted in position. The upper end of the cover is closed and sealed by the sloping top 20 having a handle 21 mounted centrally thereof.

The spring arm 14 terminates at its lower end in a rounded camming head or protuberance 22 from which the projection 15 extends inwardly through the aperture 13 to carry the valve 17.

Said head is rounded to reinforce and strengthen the acute angle between the arm 14 and projection 15, as well as form a smooth rounded outer camming surface adapted to be engaged and cammed inwardly upon lowering the cover over the container and rotating it for release therefrom. The container is provided with an outwardly flared downwardly extending deflecting louver in the form of a rounded lip 23 terminating in an aperture 24 and inwardly projecting ledge 25. The ledge 25 is inset in the plane of the lower edge of said lip 23 to lie directly under the head 22, as well as its projection 15.

When the cover is mounted over the container, as illustrated in Fig. 1, the diameter thereof with respect to the container is such that it engages the camming head 22 and presses it inwardly toward the wall of the container, thus forcing the valve 17 from the aperture 13 to permit the water to readily pass therethrough into the pan. Upon the cover being fully seated over the container, the spring arm will flex outwardly, seating the head 22 in the louver 23 of the cover, permitting the inwardly extending ledge 25 to engage under the valve projection 15. The water will then pass from under the cover or through the aperture 24 therein and seek the level of said aperture, but owing to the water seal, the water level in the pan will not rise materially above said aperture.

As is well understood, as the chicks proceed to use the water in the pan, the level therein will be maintained until the water in the container is exhausted.

By reason of the cover being latched on the container through the medium of the ledge 25 and arm 14, the entire fountain may be lifted and moved about through the handle 21 without disturbing its function. When it is desired to fill the container, the pan may be held with one hand, and through the handle 21 the cover slightly rotated so that the camming head 22 will be engaged and forced inwardly by the cover to unlatch it from the ledge 25. Thereupon the cover may be readily lifted from the container, whereupon the arm 14 will be released to close the valve 17 so that any higher level of water in the container will not cause overflow of the pan. After filling, during which the valve will prevent passage of water from the container to the pan by reason of its closed position, shown in Fig. 2, the cover may be replaced over the container so as to cam the valve open and be latched in position by the ledge 25, whereupon water will immediately flow into the pan to the desired level.

As illustrated by the arrow in Fig. 4, the flow of water through the cover aperture 24 will be deflected downwardly into the pan 12 by the louvered and rounded lip 23, to thereby avoid splashing over the edge of the pan.

The invention claimed is:

1. A drinking fountain comprising a container, a drinking pan associated with said container, said container being open at the top and provided with an aperture adjacent the bottom, a valve for controlling the passage of fluid through said aperture, a sealing cover for said container having an aperture therein, a spring arm mounted on said container for normally maintaining said valve in closed position, a rounded camming protuberance sloping downwardly and outwardly from the free end of said arm, an inwardly extending valve carrying projection bent inwardly at an acute angle from said protuberance to extend through said container aperture, an outwardly flared downwardly extending rounded lip formed on said cover terminating at said cover aperture to receive and seat said protuberance, and an inwardly and upwardly flared lip formed on said cover terminating in said cover aperture to engage and interlock with said valve carrying projection.

2. A drinking fountain comprising a container, a drinking pan associated with said container, said container being open at the top and provided with an aperture adjacent the bottom, a valve for controlling the passage of fluid through said aperture, a sealing cover for said container having an aperture therein, a spring arm mounted on said container for normally maintaining said valve in closed position, a rounded camming protuberance sloping downwardly and outwardly from the free end of said arm, an inwardly extending valve carrying projection bent inwardly at an acute angle from said protuberance to extend through said container aperture, and an interlocking ledge defining the lower edge of said cover aperture to engage and interlock with said valve carrying projection.

3. A drinking fountain comprising a container, a drinking pan associated with said container, said container being open at the top and provided with an aperture adjacent the bottom, a valve for controlling the passage of fluid through said aperture, a sealing cover for said container having an aperture therein, a spring arm mounted on said container for normally maintaining said valve in closed position, a rounded camming protuberance sloping downwardly and outwardly from the free end of said arm, an inwardly extending valve carrying projection bent inwardly at an acute angle from said protuberance to extend through said container aperture, and an inwardly and upwardly flared ledge formed on said cover terminating in said cover aperture to engage and interlock with said valve carrying projection.

4. A drinking fountain comprising a container, a drinking pan associated with said container, said container being open at the top and provided with an aperture adjacent the bottom, a valve for controlling the passage of liquid through said aperture, a sealing cover for said container having an aperture therein, a spring arm mounted on said container for normally maintaining said valve in closed position, a rounded camming protuberance sloping downwardly and outwardly from the free end of said arm, an inwardly extending valve carrying projection bent inwardly from said protuberance to extend through said container aperture, an outwardly flared downwardly extending deflecting louver formed on said cover terminating at said cover aperture adapted to deflect downwardly liquid passing therethrough, and an interlocking ledge defining the lower edge of said cover aperture to engage and interlock with said valve carrying projection.

References Cited in the file of this patent

UNITED STATES PATENTS

| Number | Name | Date |
| --- | --- | --- |
| 997,313 | Moe | July 11, 1911 |
| 2,086,341 | Tolley | July 6, 1937 |
| 2,615,425 | Berry | Oct. 28, 1952 |
| 2,618,237 | McDermott et al. | Nov. 18, 1952 |

FOREIGN PATENTS

| Number | Country | Date |
| --- | --- | --- |
| 23,502 | Great Britain | 1912 |